United States Patent [19]

Gilman

[11] 4,137,348

[45] Jan. 30, 1979

[54] PROTECTIVE MAT AND METHOD OF MAKING SAME

[76] Inventor: Richard L. Gilman, Gilman, Conn. 06336

[21] Appl. No.: 863,849

[22] Filed: Dec. 23, 1977

[51] Int. Cl.² .................... B32B 3/02; B32B 27/00; B32B 31/18

[52] U.S. Cl. ........................................ 428/33; 428/45; 428/47; 428/68; 428/71; 428/159; 428/220; 428/315; 428/322; 428/339; 428/909

[58] Field of Search .................. 428/315, 320, 322, 33, 428/44, 45, 47, 68, 71, 158, 159, 220, 339, 909

[56] References Cited

U.S. PATENT DOCUMENTS

| | | | |
|---|---|---|---|
| 3,041,220 | 6/1962 | Martin et al. | 428/315 |
| 3,198,690 | 8/1965 | Starke | 428/315 |
| 3,531,367 | 9/1970 | Karsten | 428/320 X |
| 3,586,649 | 6/1971 | Cobbledick | 428/315 |
| 3,873,407 | 3/1975 | Kumata et al. | 428/315 X |
| 3,989,870 | 11/1976 | Bocks et al. | 428/315 |
| 4,016,315 | 4/1977 | Szabo | 428/68 |
| 4,038,350 | 7/1977 | Jaques | 428/320 X |
| 4,082,874 | 4/1978 | Traylor | 428/47 X |

*Primary Examiner*—Harold Ansher
*Attorney, Agent, or Firm*—William R. Liberman

[57] ABSTRACT

An impact and energy absorbing mat is produced by extruding sheets of resilient compressible foamed polymeric resin sheets, preferably of a foamed ionomer, and having self formed skins on opposite faces. The sheets are stacked and the stack sliced along planes perpendicular to the sheets by hot wires to fuse the borders of contiguous sheets and form individual coherent slabs. Each slab is sandwiched between preferably similar polymeric resin films which are heated by hot plates to fuse the films to the slab surfaces and further fuse the skin borders to each other. Alternatively, the films may be omitted and self skins formed by the hot plate. The resulting mat includes side by side narrow foamed resilient resin strips having side skins, the borders of contiguous skins being fused to each other and the joined strips having their opposite faces covered by self or film formed skins fused thereto. The mat possesses unexpected superior energy and impact and other desirable properties.

8 Claims, 6 Drawing Figures

4,137,348

PROTECTIVE MAT AND METHOD OF MAKING SAME

BACKGROUND OF THE INVENTION

The present invention relates generally to improvements in energy absorbing and impact cushioning mats and methods of producing such mats, and it relates more particularly to an improved mat of the gymnast type and to an improved method for producing such a mat.

Many activities such as those of an athletic or physical activity nature, for example, gymnastics and the like, require the use of a large area mat upon which the activity is at least partially practiced. The mat optimally should possess certain desirable properties. It should react to many types of stresses and impacts in a predetermined manner so as to minimize any interference with the activity to which it is applied, it should minimize the hazards and dangers of injury to the participants in the activity, it should be rugged and withstand all types of wear and stress, it should be long-lived and economical, easy and convenient to store in a compact state and be highly versatile and adaptable. The mats of the above type heretofore available lack at least one or more of the above requirements, are deficient in their physical responsive properties, are expensive, are inconvenient to use, handle and store, and otherwise leave much to be desired.

SUMMARY OF THE INVENTION

It is a principal object of the present invention to provide an improved mat and an improved method of producing the same.

Another object of the present invention is to produce an improved energy absorbing impact cushioning mat and an improved method of producing such a mat.

Still another object of the present invention is to provide an improved gymnast or athletic type of mat and an improved method of producing the same.

A further object of the present invention is to provide an improved mat and method of the above nature characterized by simplicity, economy and versatility of the method, and the reliability, ruggedness, adaptability, wearability and superior physical response properties of the improved mat.

The above and other objects of the present invention will become apparent from a reading of the following description taken in conjunction with the accompanying drawing which illustrates a preferred embodiment thereof.

In a sense, the present invention contemplates the provision of an improved mat which comprises a plurality of elongated strips of a recoverably compressible cellular thermoplastic polymeric resin having the wide opposing faces thereof covered with self-formed skins, said strips being disposed in side-by-side relationship with the confronting skins of adjacent strips being contiguous and bonded to each other along their borders. While the polymeric resin is advantageously an ionomer or a mixture of ionomers, it may be other recoverably compressible thermoplastic polymeric resins, such as the polyolefins, for example, polyethylene or polypropylene, or the like. The mat formed of the bonded strips, as above specified, is advantageously sandwiched between a pair of preferably imperforate skins which may be films of the same or compatible resins heat bonded or fused to opposite faces of the mat or alternatively may be integrally heat self formed along the mat faces. The thicknesses of the strips forming the mat are less the widths thereof, that is the height of the mat, and the number of strips depends on the desired width or length of the mat and the lengths of the strips is dependent either on the length or width of the mat. The width of each strip is greater than the thickness thereof, the thickness advantageously being between 0.030 and 0.250 inch, preferably between 0.100 and 0.125 inch, and the ratio of the width to the thickness advantageously being between 0.5": 0.030" and 4.0": 0.250", preferably between 0.75": 0.100" and 1.5": 0.125". The height of the mat may be desired, for example, between 0.250 and 4.5" inches and two or more mats may be superimposed and bonded to each other by way of one or a pair of skins sandwiched between successive mats.

In fabricating the improved mat described above by the improved method, sheets of recoverably compressible cellular thermoplastic polymeric resin are superimposed to form a stack and the stack is sliced into slabs by an elongated slicing element, such as a wire, heated above the fusion temperature of the resin. Each heating element is advanced through the sheet stack along a plane perpendicular to the planes of the sheets and at a speed to fuse the edges of adjacent confronting skins without fusing or bonding the adjacent sliced slabs. Each of the slabs which are coherent are then heated along their opposite faces to further fuse the borders of the adjacent skins. The mat has then applied to opposite faces thereof skins of the same resin as the mat or of a compatible resin. The skins may be resin films heat bonded or fused to the opposite mat faces or they may be self-formed on the faces of the mat by heating the faces with hot plates or the like, the further fusing of the borders of contiguous strip skins being effected during the application or forming of the mat sandwiching skins. The cellular sheets with self formed skins are advantageously formed by extruding the thermoplastic resin with a suitable foaming agent in the known manner.

The improved mat possesses unexpectedly superior impact and stress response properties and is rugged, uniform, reliable and highly wear resistant. The improved process by which the mat is produced is simple, efficient and economical and results in a uniform product and is of great versatility and adaptability.

DESCRIPTION OF THE PREFERRED EMBODIMENTS

Figure 1:
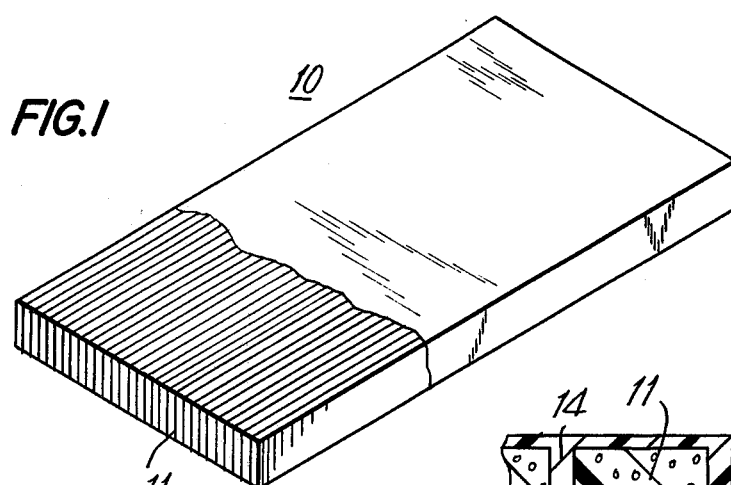
FIG. 1 is a partially fragmented perspective view of a mat embodying the present invention.
Figure 2:
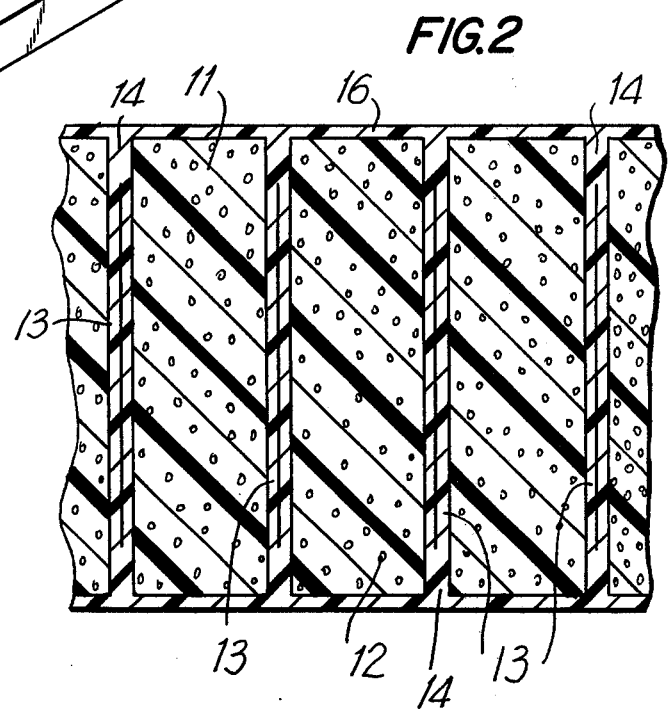
FIG. 2 is a fragmented enlarged transverse sectional view thereof.
Figure 4:
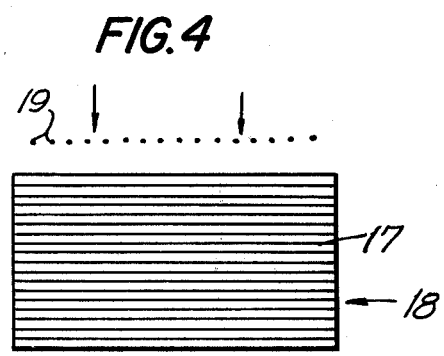
FIG. 4 is an end view of a stack of sheets and a slicing device during a step in the method of producing the mat.
Figure 3:
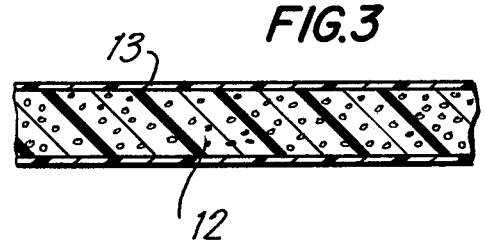
FIG. 3 is a fragmentary transverse sectional view of a sheet employed in producing the improved mat.
Figure 5:
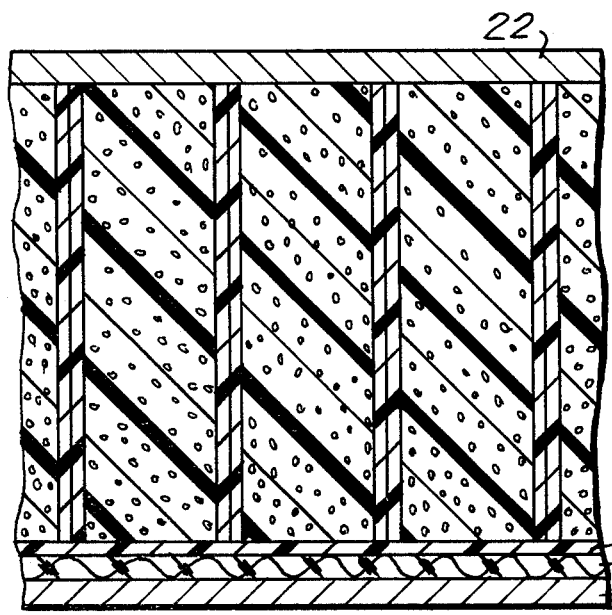
FIG. 5 is a transverse sectional view illustrating a further step in the method.

Referring now to the drawings, particularly FIGS. 1 and 2 thereof which illustrate a preferred embodiment of the present invention, the reference numeral 10 generally designates the improved mat which is shown by way of example to be of overall rectangular configuration. The mat 10 includes a plurality or group of thin longitudinally extending resilient or recoverably compressible strips 11 each having a core 12 of a foamed or cellular, preferably closed cellular thermoplastic polymeric resin, preferably an ionomer, for example, Surlyn (an ionomer resin marketed by E. I. DuPont de Nemours & Co.) and substantially imperforate relatively high density skins 13 along opposite faces of the cores, the skins 13 being integral and self formed with the cores 12 and of the same resin.

The strips 11 are are arranged in side-by-side relationship with the skins 13 along the wide faces of adjacent strips 11 being contiguous and integrally bonded by heat fusion to each other along their opposite borders as at 14. The group of bonded side-by-side strips 11 are sandwiched between a pair of opposite flexible relatively dense, substantially imperforate cover skins 16 which are formed of the same polymeric resin as the cores 12 and skins 13 or resins compatable and fusable therewith, the cover skins 16 being integrally bonded by heat fusion to the cores 12 and to the skins 13 at their fused borders 14. The cover skins 16 may be initially separately formed films or webs or they may be heat self formed from the strips 11.

The height or width of the foamed Surlyn strip 11 is between 0.5 and 4.0 inches, for example, 1.125 inch, its thickness between 0.030 and 0.250 inch, for example, 0.125 inch, and its length as desired and the number of side-by-side strips depends on the desired width of the mat 10.

Figure 6:
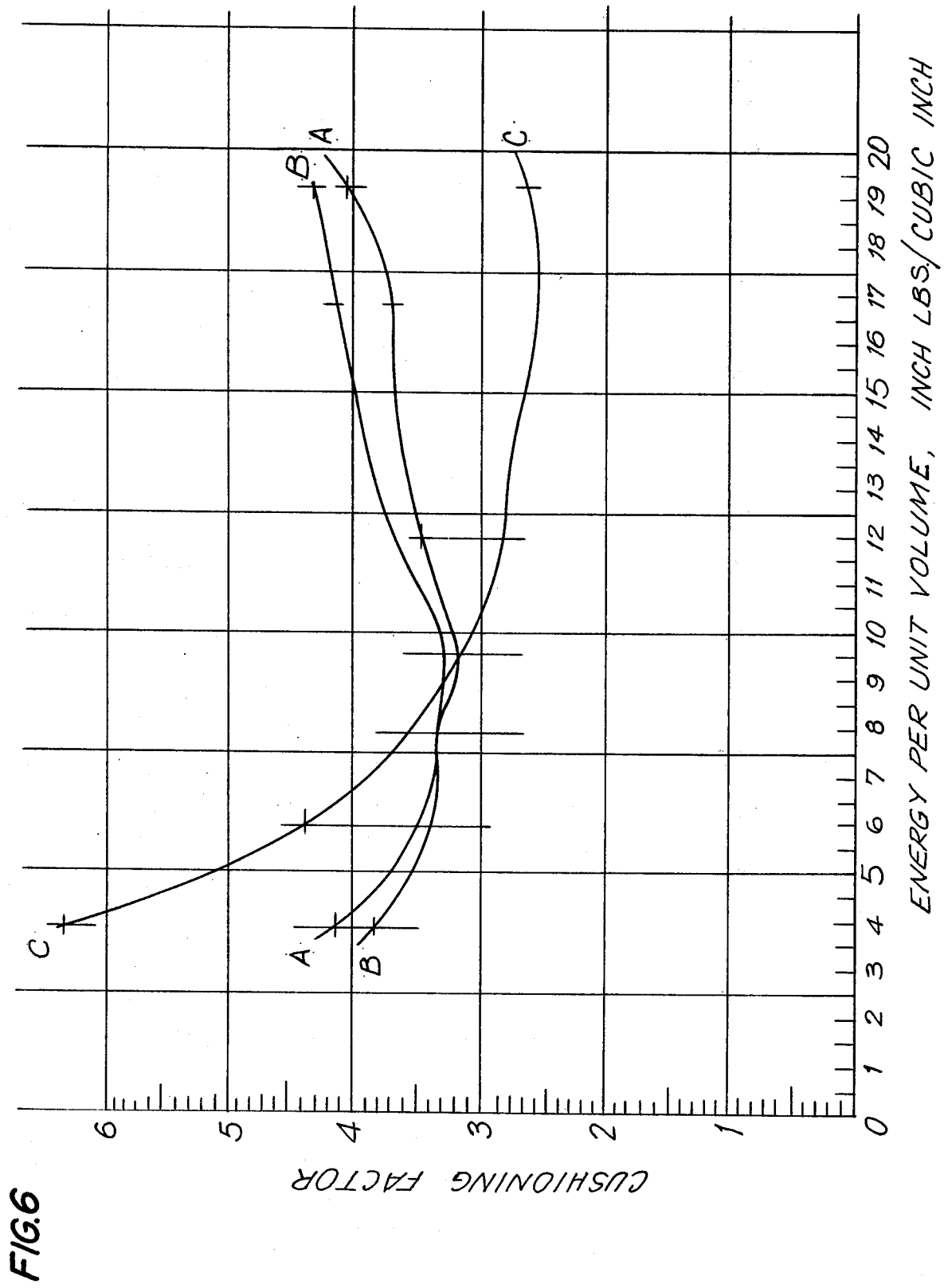
FIG. 6 is a graph showing the variation of the cushioning factor of a sample improved mat versus the energy per unit volume as compared to the corresponding responses of mats of other constructions.

In FIG. 6 of the drawings there is illustrated curves showing the variations in the cushioning factor in response to the energy per unit volume of mat in inch pounds per cubic inch of specimens of 4 inch × 4 inch × 2½ inch of mat. Curve A represents a mat formed of horizontally superimposed ⅛ inch skin sandwiched sheets of cellular or foamed Surlyn, curve B a homogenous mat of foamed polyethylene and curve C a Surlyn mat constructed in accordance with the present invention with the strips 11 being ⅛ inch thick and in vertical planes. It should be noted that in the improved mat, curve C, the cushioning factor drops sharply from a high valve to a low valve where it levels off, whereas in the other mats, curves A and B the cushioning factor gradually drops a small amount from an initial low value and then rises slowly, not falling below the early low value achieved by the present mat. Similar unexpectedly superior response properties are possessed by the present improved mat over the other mat construction with respect to other parameters such as dynamic deflection and the like.

Considering now the production of the mat 10 in accordance with the present improved process, as applied to the thermoplastic polymeric resin Surlyn, an ionomer, the resin admixed with a foaming agent suitable for use with the ionomer is extruded, in the known manner, as a sheet of a thickness between 0.030 inch and 0.250 inch, for example, 0.125 inch, including the cellular core 12 and the sandwiching self formed relatively imperforate skins 13. A plurality of sheets cut to the desired size and of a number depending on the desired size of the finished mat are horizontally superimposed to form a vertical stack 18. A horizontal grid of longitudinally extending horizontal resistance wires 19 at the transversely spaced distances corresponding to the mat height, advantageously between 0.5 and 4 inches, for example, 1.125 inches, are heated by passing currents therethrough to a temperature between 500° F. and 550° F., preferably between 520° F. and 540° F., and is advanced vertically downwardly through the preheated stack 18 at a rate to heat slice the stack 18 into discreet individual slabs 20 and to fuse the borders of the contiguous skins 13 of adjacent strips 11 to each other to form coherent slabs. The rate of descent of the wire grid may satisfactorily be about 0.11 feet per minute.

In order to apply the cover skins 16 to opposite faces of the slab 20, there is provided a heated hot plate whose top face is covered by a Teflon impregnated or coated fabric which serves as a parting surface. The hot plate is heated to at least the fusion temperature of the resin forming the slab, for example with, the Surlyn resin, the hot plate is preferably heated to a temperature of about 215° F. A Surlyn film or pellicle 21, for example, of a density of 17 pounds per cubic foot and of 50 mils thickness is superimposed on the parting surface covered hot plate and the slab 20 superimposed on the film 21 and vertically pressed by an overlying platen 22 to assure the uniform contact between the film and parting surface and the film and the slab face. The assembly of the film and slab is maintained in contact with the hot plate for a time sufficient to effect the fusion of the film 21 to the slab 20 and the further fusion of the borders of the contiguous skins 13, for example, for a period of about 70 seconds. The cover skin is similarly applied to the opposite face of slab 20 by the above procedure.

Alternatively, the films 21 may be omitted and the skins may be self-formed by the above procedure. The temperature of the hot plate and the time of application of the hot plate to the slab face are such as to melt the surface of the slab and cause it to flow and fuse to form an integral skin. During such procedure, the borders of contiguous skins 13 are further fused. In either method, it is only the borders of the contiguous skins 13 that are fused with each other, the major parts of the confronting faces of the contiguous skins being unbonded and free from each other.

While there have been described and illustrated preferred embodiments of the present invention, it is apparent that numerous alterations, additions and omissions may be made without departing from the spirit thereof.

I claim:

1. A mat having vertically spaced substantially horizontal parallel wide top and bottom faces and comprising a plurality of elongated thin strips of a recoverably compressible cellular thermoplastic polymeric resin having skins formed on the wide opposing faces thereof, said strips being disposed in face-to-face parallel relationship with the skins of adjacent strips being contiguous and bonded to each other along their borders to form a coherent body and said skins extending substantially vertically between said top and bottom faces.

2. The mat of claim 1 wherein said continguous skins of adjacent strips are unbonded to each other in the areas between said borders thereof.

3. The mat of claim 2 wherein said borders of said contiguous skins are fused to each other.

4. The mat of claim 2 wherein the thicknesses of said strips are between 0.030 and 0.250 inch and the ratio of the widths of said strips to the thicknesses thereof is between 0.5:0.030 and 4.0:0.250.

5. The mat of claim 2 wherein said resin comprises an ionomer.

6. A mat comprising a plurality of elongated strips of a recoverably compressible cellular thermoplastic polymeric resin having skins formed on the wide opposing faces thereof, said strips being disposed in face-to-face parallel relationship with the skins of adjacent strips being contiguous and fused to each other along their borders to form a coherent body, and thermoplastic cover skins bonded to the opposite faces of said coherent body of said strips.

7. The mat of claim 6 wherein the resins of said strips and said strip skins and cover skins are similar and are fused to each other.

8. The mat of claim 6 wherein said contiguous skins of adjacent strips are unbonded to each other in the areas between said borders thereof.

* * * * *